US010086326B2

(12) United States Patent
Su et al.

(10) Patent No.: US 10,086,326 B2
(45) Date of Patent: Oct. 2, 2018

(54) GAS SEPARATION MODULE AND ASSEMBLY

(71) Applicant: Membrane Technology and Research, Inc., Newark, CA (US)

(72) Inventors: Paul Su, Saratoga, CA (US); Moyeen Mohammed, Santa Clara, CA (US); Alicia Breen, Foster City, CA (US); Mamoon Rashid Khan, Newark, CA (US); Nicholas P Wynn, Redwood City, CA (US)

(73) Assignee: Membrane Technology and Research, Inc., Newark, CA (US)

( * ) Notice: Subject to any disclaimer, the term of this patent is extended or adjusted under 35 U.S.C. 154(b) by 79 days.

(21) Appl. No.: 15/409,184

(22) Filed: Jan. 18, 2017

(65) Prior Publication Data

US 2017/0282119 A1      Oct. 5, 2017

Related U.S. Application Data

(63) Continuation-in-part of application No. 15/087,388, filed on Mar. 31, 2016, now Pat. No. 9,579,605.

(51) Int. Cl.
*B01D 53/22* (2006.01)
*B01D 69/04* (2006.01)
*B01D 71/02* (2006.01)

(52) U.S. Cl.
CPC .......... *B01D 53/228* (2013.01); *B01D 69/04* (2013.01); *B01D 71/025* (2013.01);
(Continued)

(58) Field of Classification Search
CPC .......... B01D 2053/223; B01D 2319/04; B01D 71/025; B01D 53/228; B01D 69/04; B01D 2313/02; B01D 2313/13; B01D 2311/13
See application file for complete search history.

(56) References Cited

U.S. PATENT DOCUMENTS 2,411,238 A    11/1946   Zender
3,610,418 A    10/1971   Calderwood
(Continued)

FOREIGN PATENT DOCUMENTS

EP      1563894 A1     8/2005
JP    2015208714 A    11/2015

OTHER PUBLICATIONS

International Search Report and Written Opinion for PCT/US2017/024546, dated Jun. 26, 2017.

*Primary Examiner* — Anthony Shumate
(74) *Attorney, Agent, or Firm* — Timothy A. Hott; Suk. H. Chow

(57) ABSTRACT

A gas separation module and assembly for housing ceramic tubular membranes. The module includes a plurality of tubes containing the ceramic tubular membranes. The tubes are arranged parallel to one another and are supported by tube sheet plates at each end. Gas-tight seals surround each membrane, preventing a feed gas and a residue gas within the inner lumen of the membrane from mixing with a permeate gas in the tube interior. The module also contains a gas distribution pipe for withdrawing the permeate gas out of, or introducing a sweep gas into, the module. This configuration allows for ceramic tubular membranes to be modularized for use in an assembly that carries out many types of gas separations.

20 Claims, 9 Drawing Sheets

(52) U.S. Cl.
CPC .... *B01D 2053/223* (2013.01); *B01D 2311/13* (2013.01); *B01D 2313/02* (2013.01); *B01D 2313/13* (2013.01); *B01D 2319/04* (2013.01)

(56) References Cited

U.S. PATENT DOCUMENTS

| | | | |
|---|---|---|---|
| 3,616,929 A | 11/1971 | Manjikian | |
| 3,774,771 A | 11/1973 | Manjikian et al. | |
| 4,080,296 A | 3/1978 | Clark | |
| 4,976,866 A | 12/1990 | Grinstead et al. | |
| 5,013,437 A | 5/1991 | Trimmer et al. | |
| 5,141,640 A | 8/1992 | Sasajima et al. | |
| 5,192,478 A | 3/1993 | Caskey | |
| 5,202,023 A | 4/1993 | Trimmer et al. | |
| 5,288,308 A | 2/1994 | Puri et al. | |
| 5,470,469 A | 11/1995 | Eckman | |
| 5,840,186 A | 11/1998 | MacAlpine et al. | |
| 6,790,350 B2 | 9/2004 | Pex et al. | |
| 7,404,843 B2 | 7/2008 | Kaschemekat et al. | |
| 7,790,030 B2 | 9/2010 | Schwartz et al. | |
| 9,199,191 B2 | 12/2015 | Fukuda et al. | |
| 9,901,877 B2 * | 2/2018 | Van Der Burg | B01D 63/103 |
| 2004/0007527 A1 | 1/2004 | Pedersen et al. | |
| 2004/0188339 A1 | 9/2004 | Murkute et al. | |
| 2006/0144777 A1 | 7/2006 | Kumano et al. | |
| 2007/0039886 A1 | 2/2007 | Bruschke et al. | |
| 2007/0039889 A1 | 2/2007 | Ashford | |
| 2008/0011157 A1 | 1/2008 | Wynn et al. | |
| 2009/0301959 A1 | 12/2009 | Tada et al. | |
| 2010/0086824 A1 | 4/2010 | Homel et al. | |
| 2010/0224541 A1 * | 9/2010 | Takabatake | B01D 61/20 210/151 |
| 2010/0326278 A1 * | 12/2010 | Nakamura | B01D 53/22 96/8 |
| 2012/0304856 A1 * | 12/2012 | Kanetsuki | B01D 53/228 95/47 |
| 2013/0098821 A1 | 4/2013 | Espenan et al. | |
| 2014/0163664 A1 | 6/2014 | Goldsmith | |
| 2015/0217235 A1 | 8/2015 | Yamaoka et al. | |
| 2016/0023164 A1 * | 1/2016 | Karode | B01D 65/003 96/8 |

* cited by examiner

GAS SEPARATION MODULE AND ASSEMBLY

This application is a continuation-in-part of U.S. application Ser. No. 15/087,388, filed on Mar. 31, 2016, the disclosure of which is incorporated herein by reference in its entirety.

FIELD OF THE INVENTION

The invention relates to a gas separation module, and, specifically to modules and assemblies housing ceramic tubular membranes.

BACKGROUND OF THE INVENTION

Industrial gas separations require large, and costly, amounts of membrane in order to carry out the necessary processes. To perform such separations, hundreds to thousands of square meters of membrane are packaged into membrane modules. The development of different technologies for efficiently packing membranes into modules at a low cost has been ongoing since the 1960s.

Current module designs include plate-and-frame and spiral-wound modules for flat-sheet membranes, and potted hollow-fiber designs for polymeric hollow-fiber membranes. Tubular modules are used for tubular membrane configurations, including ceramic tubular membranes as described herein.

U.S. Pat. No. 7,404,843, to Kaschemekat et al. (Membrane Technology and Research, Inc.), discloses one design for housing membranes, including tubular membranes, within an assembly. The assembly contains a plurality of tubes, each housing membrane modules. The tubes are supported by a tube sheet place at one end of the assembly (the feed end) and another tube sheet at the opposite end (the permeate end). A feed gas enters the assembly via a feed port and flows through the feed end tube sheet and into the membrane modules. A permeate gas which has permeated the membrane is collected in a permeate pipe that extends beyond the permeate end tube sheet and allows the permeate gas to exit the assembly via a permeate port. A residue gas flows out of the tubes through openings found on each tube and eventually out of the assembly via a residue port.

Another design for housing tubular membranes within a module is described in U.S. Pat. No. 6,790,350, to Pex et al. (Stichting Energieonderzoek Centrum Nederland). Here, the tubular membranes are housed within larger diameter tubes and are arranged adjacent and parallel to one another. Individual membranes may be in series or two pairs in parallel with the pairs being arranged in series. While this design provides for an optimized feed flow, it is limited by its serial configuration of tubes.

Despite these designs, there remains a need for an improved gas separation module for housing ceramic tubular membranes that permits parallel flow to all membranes, allows for a sweep gas to be introduced or a second permeate stream to be withdrawn from it, is inexpensive to manufacture, and provides for easy replacement of modules within an overall assembly.

SUMMARY OF THE INVENTION

The present invention relates to a gas separation module and a gas separation assembly that house ceramic tubular membranes. Unlike conventional modules that house tubular membranes, the module of the invention allows all membranes to be fed in parallel. Furthermore, the assembly allows for modules to be connected together within the assembly, significantly decreasing construction costs and footprint. Also, the modules can be easily installed or removed from the assembly, making it easy to replace modules.

In a basic embodiment, the gas separation membrane module, comprises:
(a) a plurality of tubes each having a longitudinal tube wall comprising at least one first permeate gas opening and a tube interior containing a ceramic tubular membrane that has an outside surface, an inner surface, and an inner lumen, wherein the space between the outside surface of the membrane and the tube wall form a permeate flow channel within the tube interior that is in gas-transferring communication with the permeate gas openings;
(b) a first tube sheet plate and a second tube sheet plate each positioned at opposite ends of the module, the first tube sheet plate containing a gas distribution pipe opening and a plurality of feed gas openings, one feed gas opening for each tube, and the second tube sheet plate having a plurality of residue gas openings, one residue gas opening for each tube, the tubes being aligned with the feed and residue gas openings to provide gas-transferring communication between the feed and residue gas openings and the inner lumens;
(c) a gas distribution pipe that runs through the gas distribution pipe opening, having a pipe interior comprising at least one first permeate aperture to provide gas-transferring communication with the permeate gas openings; and
(d) a gas-tight seal at each end of each ceramic tubular membrane for holding the membrane in gas-tight relationship against the first and second tube sheet plates to prevent a feed or residue gas from entering the permeate flow channel.

The module of the invention includes a group of tubes, each containing a ceramic tubular membrane. The tubes are hollow, allowing for a ceramic tubular membrane to be inserted inside. The tubes also have one or more small openings or holes in the tube wall at one end, allowing a permeate gas to exit the tube and enter a gas distribution pipe. In certain aspects, there are also holes at the other end of the tube for a second permeate stream or a sweep stream to exit or enter the tube, respectively.

The membranes described herein are ceramic, or inorganic, tubular membranes. These membranes have an outside surface and an inner surface defining an inner lumen. For purposes of the present invention, the membrane selective layer is on the inside surface. Accordingly, a permeate component within a feed gas passes from the inner lumen to the outer surface (known as bore-side feed). In other aspects, the membrane selective layer may be on the outside surface where the feed gas passes from the outer surface to the inner lumen (known as shell-side feed).

The tubes are supported at each end by tube sheet plates. The tube sheet plates contain corresponding openings for each tube. The openings are large enough for a feed gas to enter into the inner lumen or a residue gas to be withdrawn from the inner lumen of the membrane.

The tubes containing the ceramic tubular membranes are mounted against or into the tube sheet plates parallel to one another. When the module is in use, the openings at the feed end of each tube enable each tube, and the membrane contained therein, to receive some (a non-zero portion) of the raw feed gas entering the module. This configuration means that the tubular ceramic membranes all operate in parallel to treat the raw gas. To our knowledge, this geometric arrangement is different from all currently known module designs that incorporate more than one tubular ceramic membrane.

In conventional designs, at least some of the tubes are arranged in a series flow configuration, such that gas under treatment can only enter the second or subsequent tubes in the series after it has already passed through the first or previous tubes in the series. In other words, at least some of the tubular ceramic membranes are fed only with residue gas that has already exited another membrane in the module.

The ability to provide entirely parallel flow for all the membranes in the module improves the internal design of the module. This is particularly so when large numbers of tubular ceramic membranes, such as 10, 20 or more, are to be mounted in the module. Furthermore, the "all-parallel" arrangement provides a gas-processing regimen that has not previously been available for users of tubular ceramic membranes. If multiple membranes are connected in series, the inevitable pressure drops that arise along the train of modules from the end that accepts the raw feed to the end that discharges the finished residue may diminish the separation performance of the module, especially if the path from membrane to membrane involves a change in direction of gas flow. Other performance losses arise because the second and subsequent modules receive a partially treated feed gas. This gas has a lower concentration of the component(s) that are faster permeating, and which have, therefore, already passed preferentially into the permeate gas stream. As a result, the driving force for separation in the second and subsequent membranes is reduced compared to the initial driving force.

Preferably, the tube sheet plates contain an opening large enough for a gas distribution pipe to fit through it. The gas distribution pipe allows for a permeate gas to exit, or a sweep gas to enter, the module. In certain aspects, it may be desirable to withdraw the permeate gas from only one end of the module. In this configuration, only one of the tube sheet plates will contain an opening for the gas distribution pipe.

In some aspects, the gas distribution pipe may be divided into separate first permeate and second permeate/sweep gas sections having no gas communication between them. Dividing the gas distribution may be done by any convenient method, such as by a gas-tight plate or by a partially filled/blocked pipe. By dividing the pipe into these sections, the first permeate gas is prevented from traveling completely down the pipe and mixing with a second permeate/sweep gas. The gas distribution pipe has at least one aperture, and usually multiple apertures, through which permeate gas can pass to enter into the gas distribution pipe (or for sweep gas to access the tubes).

When the module is in use, there should be no gas transfer between the outer or shell sides of the tubular ceramic membranes, which are exposed to permeate gas/sweep gas, and the bores, which carry the feed and residue gases, except by permeation through the membranes. The ends of the membranes must, therefore, be held in gas-tight manner against the inner walls of the tubes and/or the tube sheet plates in a manner to prevent such gas transfer. The seal may be created or formed in any manner necessary to prevent leaking of any fluid. Typically, a gas tight seal can be achieved by the use of a U-cup or O-ring. Other components, such as washers and spacers, may be used as frontstops or backstops in combination with the seal in order to make the seal gas-tight.

Owing to manufacturing constraints, ceramic tubular membranes are generally fabricated in short sections, approximately 1 meter long. Thus, in another aspect, the present invention includes a gas-tight connector that connects sections of ceramic tubular membrane within a single tube to form a single longer membrane within that tube. In this manner, a single straight membrane with a length of as much as 2 meters or more can be made.

The gas-tight connector is made up of two pieces. One piece is applied over the end of one membrane section and the other piece is applied over the end of a second membrane section. The connector has interlocking components that, when aligned and rotated, secures the two sections together. A locking pin is placed in one of the interlocking components, which adds to the security of the connection. Within the interior of the connector is a gasket to seal the connector so that no feed gas or residue gas leaks from the inner lumen of the membrane. The connector offers essentially no obstruction to gas flow in the feed or permeate channels, enabling the connected sections to function as a single membrane.

In an alternative embodiment, the module does not contain the support tubes, but rather has the ceramic tubular membranes supported between the tube sheet plates. In order to direct the permeate gas to the gas distribution pipe (or a sweep gas out of the gas distribution pipe), a series of baffles are placed around the membranes. The baffles are supported by tie rods that are connected to the tube plates and are parallel to the membranes. Despite having to include baffles in this configuration, the lack of tubes helps to reduce the cost and weight of the module.

In another embodiment, the present invention relates to a gas separation assembly housing a single module as described above, the assembly comprising:

(a) a vessel having a first head comprising a permeate nozzle, a second head, and a shell between the heads, the heads and the shell defining a vessel interior;

(b) a module as described herein mounted in the vessel interior, and aligned with the gas distribution pipe protruding towards or through the first permeate nozzle;

(c) a gas-tight seal around each of the first and second tube sheet plates for holding the module in a gas-tight relationship against the shell, thereby creating a module interior between the first and second tube sheet plates, a feed chamber between the first head and the first tube sheet plate, and a residue chamber between the second head and the second tube sheet plate;

(d) a feed nozzle located on the vessel in gas-transferring communication with the feed chamber; and (e) a residue nozzle located on the vessel in gas-transferring communication with the residue chamber.

The vessel may be of any shape and construction appropriate to its function, which is to contain the modules, and to provide pressure- and gas-tight spaces or environments into which gas can be introduced, and from which it can be withdrawn. Typically, the vessel is a steel pressure vessel with two ends and an elongated central section, adapted to withstand the relatively high differential pressures that are used in gas separations, and pressure code-stamped accordingly.

Most preferably, the vessel is a cylindrical shell with two removable end plates or heads. The first head typically contains a first permeate nozzle that is connected to, or permits passage of, the gas distribution pipe so that a permeate gas can enter the assembly. Depending on the module configuration, the second head may contain a second permeate nozzle, a sweep gas nozzle, or no nozzle at all. In certain embodiments, the assembly also contains a first permeate extension pipe that runs through the first permeate nozzle of the first head and a second permeate/sweep gas extension pipe running through the second permeate/sweep gas nozzle of the second head. Each of these extension pipes may be connected and in gas-transferring communication with the gas distribution pipe.

The vessel is equipped with at least one feed nozzle that is connected to the feed chamber. The feed nozzle may be located either on the shell or the first head of the vessel so long as it is in gas-transferring communication with the feed chamber. Likewise, a residue nozzle may be located either on the shell or the second head of the vessel so long as it is in gas-transferring communication with the residue chamber. The feed and residue chambers may be located on either side of the vessel depending on the desired configuration for the separation.

The vessel and the tube sheet plates are connected in a gas-tight relationship with each other by expandable seals or the like, so that gas from inside the module cannot leak outside of the module. The seals create a module interior within the shell section of the vessel, which contains permeate gas at low pressure when the module is in use. At either end of the vessel adjoining the heads, the seals define the feed and residue chambers, which are at high pressure when the module is in use.

In some embodiments, the assembly may also contain a dividing plate that is positioned between the tube sheet plates within the module interior. The dividing plate separates the module interior into a first permeate chamber and a second permeate/sweep gas chamber, preventing the two gases from mixing with each other. Because the dividing plate is located within the module interior, it has openings for the gas distribution tube and each tube housing the ceramic tubular membranes.

The dividing plate is sealed against the shell of the vessel in a gas-tight relationship. During operation, there is usually little pressure drop between the first permeate and second permeate/sweep gas streams, and hence little pressure difference between the gas in the first permeate and second permeate/sweep gas chambers. In this case, the dividing plate need not be resistant to high pressure differences, and can be made relatively thin, or of a relatively light, inexpensive material.

The vessel may contain a single module or, more preferably, multiple modules. In this embodiment, residue gas leaving one module can flow into the tubes of the other module as a feed gas. Accordingly, the present invention also relates to an assembly for housing more than one gas separation membrane module as described above, the assembly comprising:
  (a) a vessel having a first head comprising a first permeate nozzle, a second head, and a shell between the heads, the heads and the shell defining a vessel interior;
  (b) at least two modules as described herein mounted in the vessel interior;
  (c) a gas-tight seal around each of the first and second tube sheet plates of each module for holding the modules in a gas-tight relationship against the shell, thereby creating a module interior between the first and second tube sheet plates, a first chamber between the first head and the first tube sheet plate of the first module, a second chamber between the second tube sheet plate of the first module and the first tube sheet plate of the second module, and a third chamber between the second head and the second tube sheet plate of the second module;
  (d) a feed nozzle located on the vessel in gas-transferring communication with one of the chambers; and
  (e) a first residue nozzle located on the vessel in gas-transferring communication with one of the chambers.

In some embodiments, the assembly also contains a first permeate extension pipe that runs through the first permeate nozzle of the first head and a second permeate/sweep gas extension pipe running through the second permeate/sweep gas nozzle of the second head. Each of these extensions pipes may be connected and in gas-transferring communication with the gas distribution pipe.

The vessel is equipped with at least one feed nozzle that is connected to the feed chamber. The feed nozzle may be located either on the shell or the head of the vessel so long as it is in gas-transferring communication with the feed chamber. Depending on the configuration of the vessel, the feed chamber may be the second chamber located in the middle of the vessel, between two modules (a center-feed configuration), or at one end of the vessel, either the first chamber between the first head and the first tube sheet plate of a module or the third chamber between the second head and the second tube sheet plate of a module.

Likewise, a residue nozzle may be located either on the shell or the head of the vessel so long as it is in gas-transferring communication with the residue chamber. Again, depending on the type of configuration, the residue chamber(s) may be located in the first, second, and/or third chambers, but will not be the same chamber as the feed chamber. Additional nozzles may be added to the vessel as necessary.

In certain embodiments, the modules are connected end-to-end by the gas distribution pipe so that permeate gas leaving one module can flow into the gas distribution pipe of the other module. However, in other embodiments, for example in a center-feed configuration where a permeate gas is withdrawn from both sides of the vessel, the modules may not be connected.

While the module and assembly described above relate to gas separation, it is not intended to be limited to just that application. In some embodiments, the present invention can be used for other types of fluid separations, such as vapor separation or liquid phase separation, or for pervaporation.

It is to be understood that the above summary and the following detailed description are intended to explain and illustrate the invention without restricting it in scope.

DETAILED DESCRIPTION OF THE INVENTION

Figure 1:
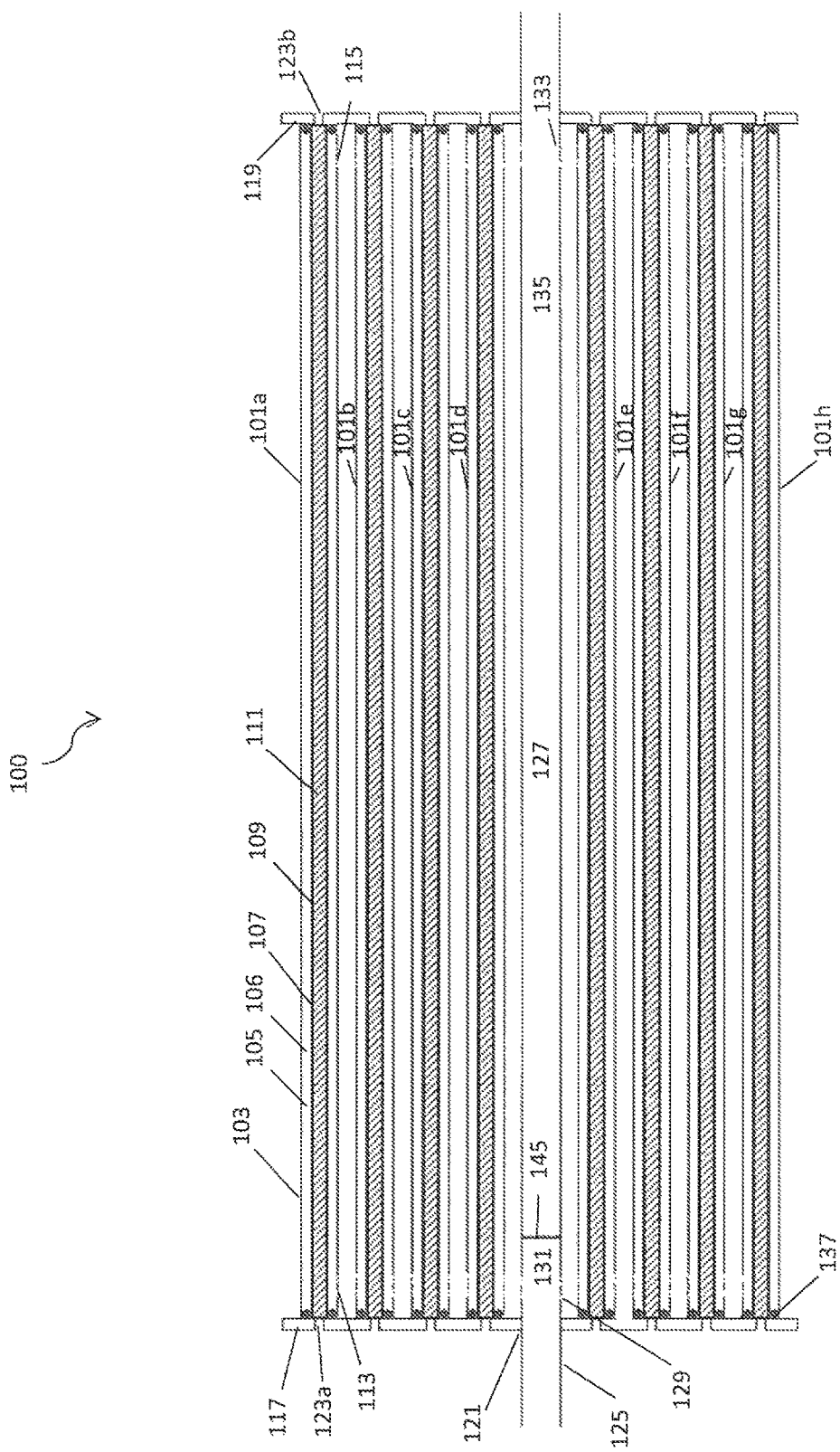
FIG. 1 is a schematic drawing showing an embodiment of the gas separation membrane module.

The invention is a gas separation module for tubular ceramic membranes, and an assembly for housing such a module. The module provides for multiple tubular ceramic membranes to be assembled together in a fully parallel arrangement. By this, we mean that a raw feed gas entering the module can be distributed between the membranes such that every membrane in the module is fed in parallel with its own portion of a raw feed gas. The assembly houses one or more of such modules. Within the assembly the individual modules may be arranged in series, such that residue gas from one module becomes feed gas for the next; in parallel, such that raw feed gas entering the assembly is distributed between the modules for treatment; or in an array having a combination of modules in parallel and modules in series.

The ceramic tubular membranes have an outer surface layer and an inside surface, forming an inner lumen. For simplicity, in the embodiments described herein, the inside surface layer comprises the membrane selective layer, meaning that a permeate component in a feed gas will flow from the inner lumen to the outside surface.

The membranes of the present invention are ceramic tubular membranes made from an artificial or inorganic material. Such materials include, but are not limited to, alumina, titania, zirconia oxides, silicon carbides.

The ceramic tubular membranes are housed within hollow tubes, one membrane per tube. Typically, the module will comprise two or more tubes, arranged generally parallel to one another. There is no upper limit on the number of tubes. Conveniently, the tubes may be arranged symmetrically around the gas distribution pipe (discussed below), but any configuration that allows for raw feed gas distribution to every tube in the module is within the scope of the invention. The tubes comprise a longitudinal tube wall and a tube interior. Each tube has at least one aperture, a permeate aperture, in the longitudinal wall for discharging permeate gas.

As is known in the art, a driving force for transmembrane permeation may be supplied by passing a sweep gas across the permeate side of the membrane, thereby lowering the partial pressure of a desired permeant on that side to a level below its partial pressure on the feed side. In this case, the total pressure on the permeate side may be higher than on the feed side, or there may be additional driving force provided by keeping the total feed pressure higher than the total permeate pressure. Accordingly, in some embodiments, the tube may have at least one other aperture for admitting a sweep gas. In other embodiments, the module may be configured to discharge a second permeate gas, thus the tubes may contain at least one second permeate aperture. The apertures should be positioned near the ends of the tubes; their location with respect to other elements of the module and assembly will be explained with respect to the figures.

The membranes are inserted into the tubes through the open ends of the tube. Accordingly, the diameter of the tubes must be large enough for the ceramic tubular membrane to fit within it. When the membrane is placed into the tube, a gap is formed between the outer surface layer of the membrane and the tube wall. This gap forms a permeate channel (or a sweep gas channel, as the case may be) for a permeate gas (or sweep gas) to flow down the tube during operation.

The tubes are held within the module by means of tube sheet plates, one placed at one end of the tube and the other at the opposite end. The tube sheet plate may directly or indirectly support the tubes in any convenient manner. Thus, the tubes may butt against the tube sheet plates, fit into holes, grooves or lips in the tube sheet plate, be welded to the tube sheet plates, or protrude through holes in the tube sheets, for example.

Likewise, the membranes may be contained entirely within the tube, be flush, or protrude beyond the tube depending on the specific seal.

In order to prevent feed or residue gas from mixing with the permeate gas within each tube, an expandable gas-tight seal, such as an O-ring or the like, is placed around the ends of the membrane.

The tube sheet plates comprise a gas distribution pipe opening and a plurality of feed/residue gas openings, one for each tube. The tubes are aligned over the feed/residue gas openings to provide gas-transferring communication between the gas openings and the inner lumen of each membrane. The diameter of the gas openings is typically smaller than the diameter of the membrane so that the membranes are secured between the two tube sheet plates. Preferably, the diameter of the gas opening is approximately equal in size to the diameter of the inner lumen. This allows for an unrestricted feed flow to enter or a residue flow to exit the inner lumen and pass through the gas opening.

In certain embodiments, multiple tube sheet plates, support plates, or caps may be placed at the ends of the module, adjacent to the original tube sheet plates in order to direct the flow of the feed, permeate, or residue gases into or out of the module or to provide extra support for the tubes, or in some cases, just the membranes. If used, the plates or caps typically have at least a gas distribution pipe opening.

The tube sheet plates can be made of any convenient material that is strong enough to be subjected to whatever pressure difference is maintained between the feed/residue gases and the permeate gas during operation. Typically, the tube sheet plates and tubes will be metal, usually steel, either stainless or carbon, or aluminum, although other metals, or even non-metallic materials, could be used in some circumstances, such as for treating mixtures at relatively low pressures. The tube sheet plates need to be pressure-rated accordingly, and will often have to withstand a pressure difference of several hundred psi or more. The tube sheet plates and tubes may be made of the same material, or of different materials.

Typically, a gas distribution pipe runs the length of the module and through the tube sheet plates. Between the tube sheet plates, the gas distribution pipe comprises at least one permeate aperture at one end of the pipe. In some embodiments, the pipe further comprises at least one sweep/second permeate aperture at the opposing end. The gas distribution pipe allows for a permeate gas to flow from the tubes to the pipe and to exit the module (or for a sweep gas to enter the module and flow to the tubes through a sweep aperture).

After treatment, the treated permeate gas stream may exit the tubes, flow to the gas distribution pipe through the permeate aperture, and out of the module.

In embodiments in which a sweep gas is introduced into the module or a second permeate gas is withdrawn from the module, it is necessary to divide the interior of the gas distribution pipe into a first permeate section and a sweep/second permeate section in order to prevent the first permeate gas from mixing with the sweep/second permeate gas. The dividing of the pipe interior can be done in any convenient way, such as by a gas-tight plate, which is located between a first permeate aperture at one end of the pipe and a sweep/second permeate aperture at the other end. In some cases, multiple gas-tights plates may be used to divide the pipe interior.

In most cases, the gas distribution pipe runs the length of the module, which adds to the overall stability of the module. However, in other embodiments, the gas distribution pipe does not run the length of the module. In these embodiments, there may be two separate short distribution pipes, a first permeate pipe at one end of the module and a sweep/second permeate pipe at the other.

In alternative embodiments, the tubes containing the ceramic tubular membranes may be dispensed with, leaving the ceramic tubular membranes exposed between the tube sheet plates. The membranes are connected to the tube sheet plates in a gas-tight manner, such as by bonding them directly to the plates or using gas-tight seals of the type described below. In order to direct the permeate gas to the gas distribution pipe from the exposed membranes and to improve flow distribution within the module (or sweep gas out of the gas distribution pipe to the exposed membranes), a series of straight or curved baffles, fins, or ribs extend partially around the module. These baffles, fins, or ribs are supported by tie rods may be placed between the tube sheet plates.

In some embodiments, within each tube, the ceramic tubular membrane is made up of two or more membrane sections, tightly coupled together by a gas-tight connector. In this manner, longer membranes can be formed than would normally be possible.

The assembly incorporates one or multiple gas separation membrane modules contained within a vessel or housing. Typically, during operation, the assembly is positioned on a metal frame or skid. The assembly is usually positioned in a substantially horizontal orientation, but in a less preferred embodiment, may also be substantially vertical.

The vessel or housing has an outer wall or shell, end plates or heads, and an interior space located between two end plates. The outer wall of the vessel is typically of similar material to the tubes and tubes sheet plates, but may vary depending upon the use to which it is to be put and the pressure-rating required. The vessel is pressure rated to provide an internal environment in which membrane gas separation can be carried out safely even at substantially different (higher or lower) pressures than the outside atmospheric pressure.

In some embodiments, the outer wall or shell may further comprise a feed nozzle near the first end plate and a residue nozzle near the second end plate.

At least one of the heads, and preferably both, should be a reversibly removable end plate or cap to provide access to the vessel interior for installation or removal of modules. By this, we mean that the head should preferably not be a unitary part of the vessel, nor attached by welding, but should be bolted, screwed, or the like, to the vessel. The end plates may have any appropriate profile, but usually will be flat or domed. Removable end plates typically include a flange or flanges or a screw thread for attachment to the shell body of the vessel. However, any convenient means of connection of the ends is intended to be within the scope of this embodiment.

At least one of the end plates includes a first permeate nozzle. In other cases, the other end plate may contain a second permeate/sweep gas nozzle. The ends of the gas distribution pipe, or extensions thereto, will typically pass into or through these nozzles, enabling permeate gas to leave or a sweep gas to enter the vessel. Optionally, in certain embodiments, the end plates may further comprise a feed nozzle for introducing a feed gas into the vessel or a residue nozzle for withdrawing a residue gas out of the vessel.

Between the end plates and within the shell of the vessel is the vessel interior, which contains the module(s). An expandable gas-tight seal, such as an O-ring, U-cup, or the like, is placed around each of the tube sheet plates in order to hold the module in a gas-tight relationship against the shell. By placing the seals around the tube sheet plates, the seals create a module interior between the first and second tube sheet plates. Additionally, the seals also create a feed gas chamber between the first end plate and first tube sheet plate of the module and a residue chamber between the second tube sheet plate and the second end plate. The seals prevent any permeate gas from leaking out of the module interior and mixing with the feed and residue gases and vice versa.

In some embodiments, the assembly further comprises a dividing plate located within the module interior that divides the module interior into a first permeate chamber and a second permeate/sweep chamber. The dividing plate also helps to prevent the sweep gas from flowing down the module and bypassing the tubes.

The dividing plate may be placed in any location within the module interior between the first permeate and second permeate/sweep gas apertures of the gas distribution pipe. The dividing plate is able to create these discrete chambers because it is in a gas-tight relationship against the shell. Since the dividing plate is within the module interior, it also has a gas distribution pipe opening and a plurality of tube openings for each tube containing a membrane. In some embodiments, more than one dividing plate may be used.

The vessel interior is long enough to contain at least one module, and preferably more than one, end to end. In some cases, the vessel interior contains more than four membrane modules, and in other cases, may include more than six membrane modules. There is no upper limit on the number of modules that can be housed in the vessel, subject only to maintaining adequate performance when in use.

In embodiments where the vessel contains more than one module, the gas distribution pipe of a first module is typically connected by a gas-tight connector or coupling to the gas distribution pipe of a second module. In this arrangement, the feed, residue, and permeate gases are able to flow from module-to-module, as will be explained in more detail below.

In some embodiments, the modules within the assembly may be connected in different ways. That is, for example in one-sided permeate vessels, one module may have a gas distribution pipe running through both tube sheet plates while a second module may have a gas distribution pipe running through only one tube sheet plate (the tube modules being connected to one another by their respective gas distribution pipes).

In yet another embodiment, in assemblies containing more than one module, the feed nozzle and feed chamber may be located between two modules within the vessel in a center-feed type position. This configuration is advantageous as it helps to reduce pressure drop across the modules in the vessel as well as reduce the number of vessels required to contain modules for the particular separation process.

When loaded with membrane modules, the assembly may be used to treat or separate any gas mixture, but is expected to be especially useful in applications where large numbers of membrane modules are needed. Such applications include, but are not limited to, treatment of natural gas streams, treatment of process gas or off-gas streams in refineries, and treatment of gases in petrochemical plants.

Specific representative embodiments of the invention are now illustrated with reference to FIGS. 1-9.

A view of a basic embodiment of the gas separation membrane module is shown in FIG. 1.

Referring to this FIG. 1, a module, 100, contains a plurality of tubes, 101a-h. For purposes of simplicity and clarity, only one tube, 101a, and the membrane contained therein are referred to here. It is to be understood that each tube and membrane in the module are identical to tube 101a.

Each of the tubes comprise a longitudinal tube wall, 103, and a tube interior, 105, which is enclosed by the tube wall. The tube wall comprises at least one permeate gas opening, 113, at one end and a sweep/second permeate gas opening, 115, at the other end.

A ceramic tubular membrane, 107, is housed within tube 101a. Ceramic tubular membrane 107 comprises an outside surface, 109, an inner surface (not labeled here for simplicity, but labeled in FIG. 2 as discussed below), and an inner lumen, 111. The inner surface of the membranes comprises the membrane selective layer. Within tube interior 105, the space between the outside surface, 109, and the tube wall, 103, is the permeate (or second permeate/sweep) flow channel, 106.

The tubes, 101a-h, are held within the module, 100, by means of a first tube sheet plate, 117, and a second tube sheet plate, 119. Tube sheet plates, 117 and 119, comprise a gas distribution pipe opening, 121 (only one shown), and a plurality of feed/residue gas openings, 123a-b, for each tube, 101a-h. The tubes are aligned over the feed/residue gas openings, 123a-b (only one opening is labeled for simplicity), to provide gas-transferring communication between the feed/residue gas openings, 123a-b, and the inner lumen, 111, of membrane, 107.

Gas-tight seals, 137 (only one labeled for simplicity), are placed at the end of each ceramic tubular membrane, 107, for holding the membrane in gas-tight relationship against the tube sheet plates, 117 and 119.

Figure 2:
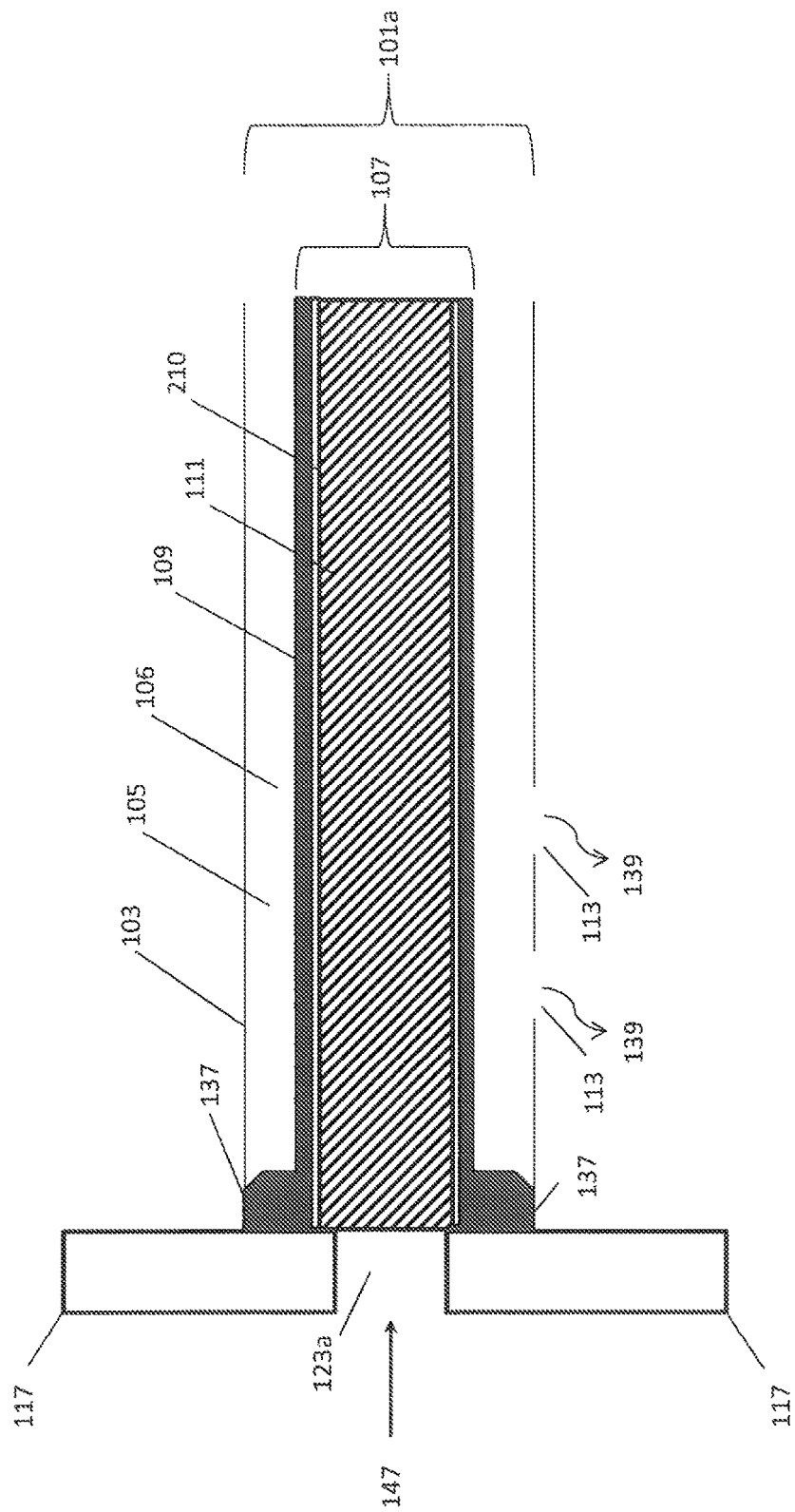
FIG. 2 is zoomed-in view of one end of the gas separation membrane module of FIG. 1.

A zoomed-in view of one end of the tube, 101a, is shown in FIG. 2.

From this figure, it can be seen that during operation, a feed gas, 147, enters the tube, 101a, through a feed gas opening, 123a, and into the inner lumen, 111. The feed gas comes into contact with the inner surface, 210, of membrane, 107. In operation, a permeating component within the gas will flow into the tube interior/permeate flow channel, 105/106, and exit the membrane, 107, as a permeate gas, 139, via permeate gas openings, 113.

Referring back to FIG. 1, a gas distribution pipe, 125, runs the length of module 100 and through tube sheet plates, 117 and 119. The gas distribution pipe, 125, has a pipe interior, 127, that is divided into a first permeate section, 131, and a second permeate/sweep section, 135 by a gas-tight plate, 145. In the first permeate section, 131, the gas distribution pipe, 125, contains at least one first permeate gas aperture, 129, that is in gas-transferring communication with the permeate gas openings, 113, of each tube, 101a-h. In the second permeate/sweep section, 135, the gas distribution pipe, 125, contains at least one second permeate/sweep aperture, 133, that is in gas transferring communication with the second permeate/sweep gas openings, 115, of each tube, 101a-h.

Figure 8:
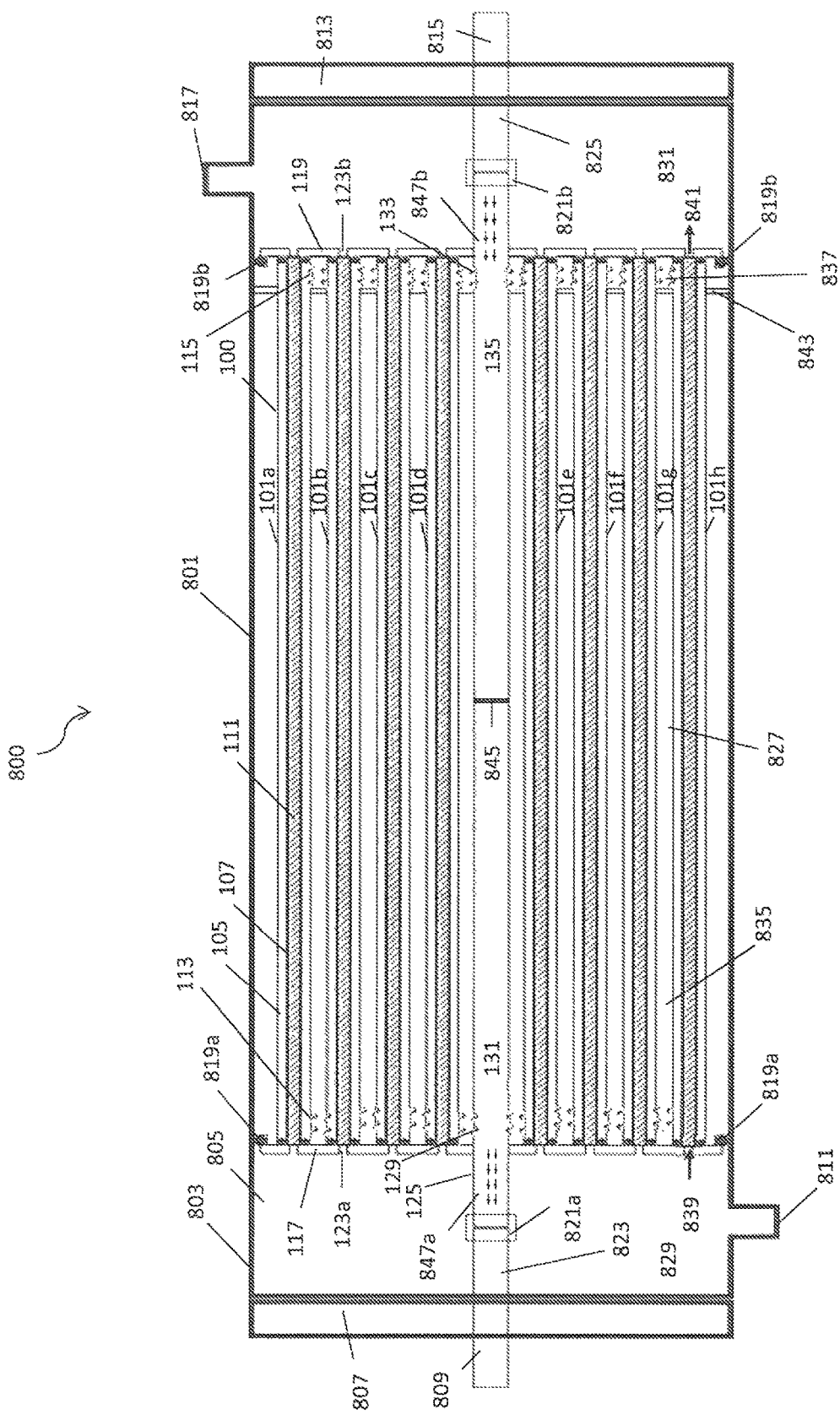
FIG. 8 is a schematic drawing showing an embodiment of an assembly adapted to house the module of FIG. 1.

The operation of the module, 100, is discussed in further detail below in reference to FIGS. 8 and 9.

Figure 3:
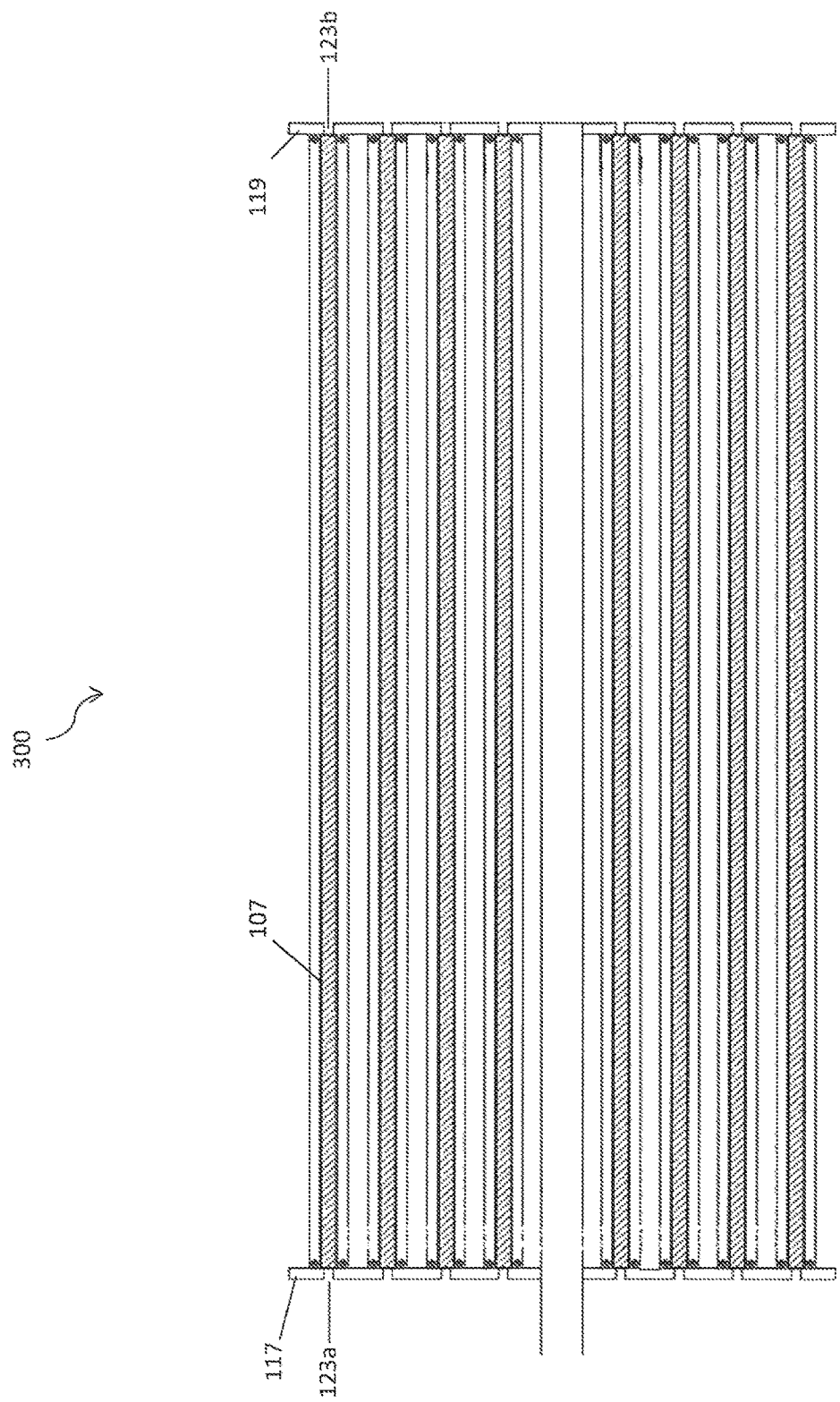
FIG. 3 is a schematic drawing showing an embodiment of the gas separation module of FIG. 1 where permeate gas can exit the module at only one end.

In some cases, it may be preferred that a permeate gas be withdrawn from only one end of a module. Such an embodiment is shown in FIG. 3.

Module 300, is identical to module, 100, discussed above in FIG. 1, except that the gas distribution pipe, 125, contains only one opening for permeate gas to exit the module. Additionally, in this embodiment, no sweep gas or second permeate gas is introduced into or withdrawn from the module. Accordingly, the tubes and gas distribution pipe lack such openings and apertures, respectively. In some embodiments, a cap or solid plate can be placed over the other end of the gas distribution pipe, 125, in order to block the permeate gas from exiting the module.

Figure 4:
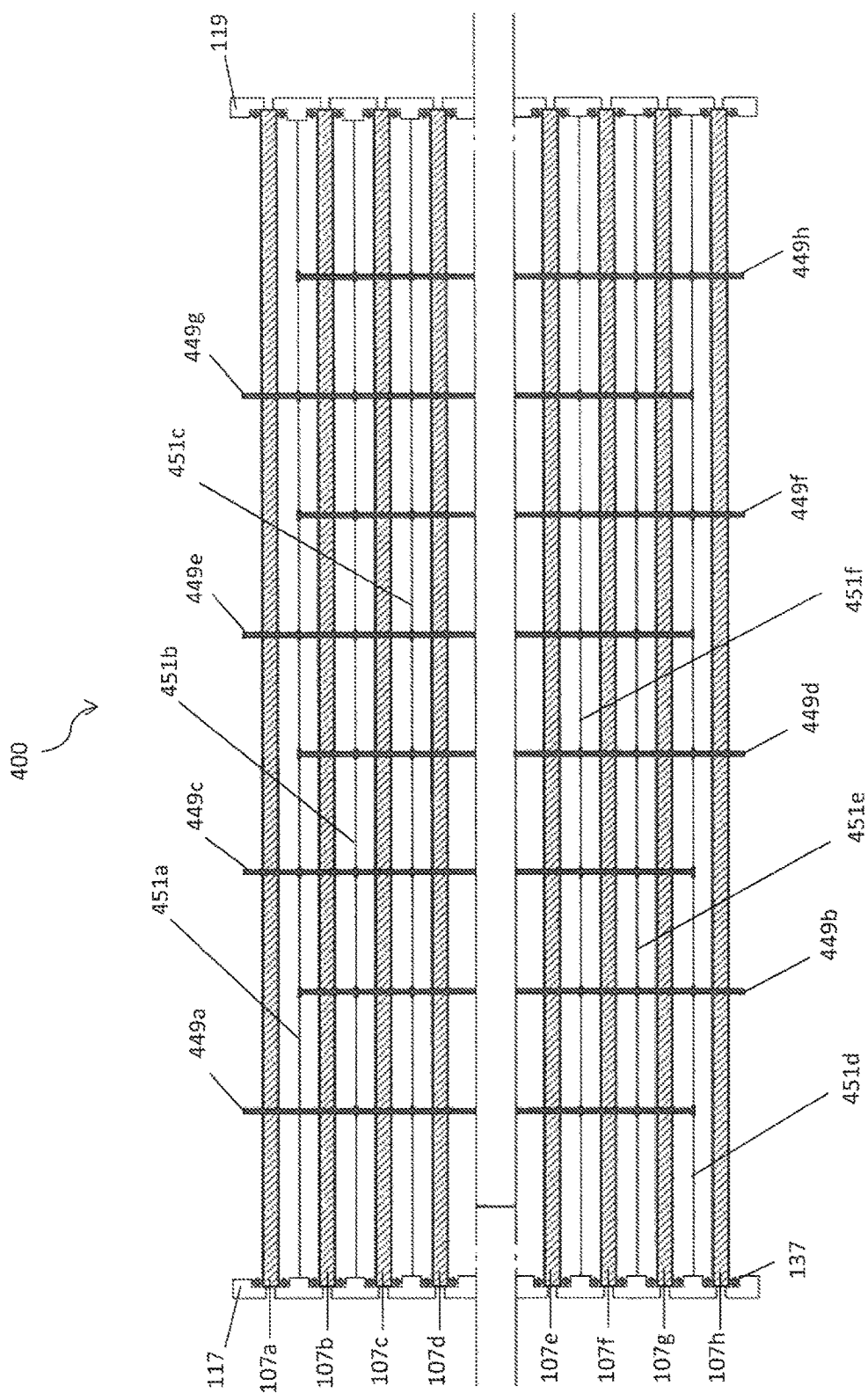
FIG. 4 is a schematic drawing showing an embodiment of the gas separation membrane module wherein the ceramic tubular membranes are not housed within tubes.

A view of an embodiment of the gas separation membrane module wherein the membranes are not housed within tubes is shown in FIG. 4. In this embodiment, the module, 400, retains all the components of module 100, from FIG. 1, except for the tubes.

Membranes, 107a-h, are supported against the tube sheet plates, 117 and 119. Gas-tight seals 137 surround the membranes, 107a-h, and butt up against the tube sheet plates, 117 and 119. Baffles, 449a-h, are positioned between tube sheet plates 117 and 119 to assist in directing the permeate gas out of, or the sweep gas to, the membranes, 107a-h. Tie rods 451a-f extend across module 400 from the first tube sheet plate 117 to the second tube sheet plate 119.

Figure 5:
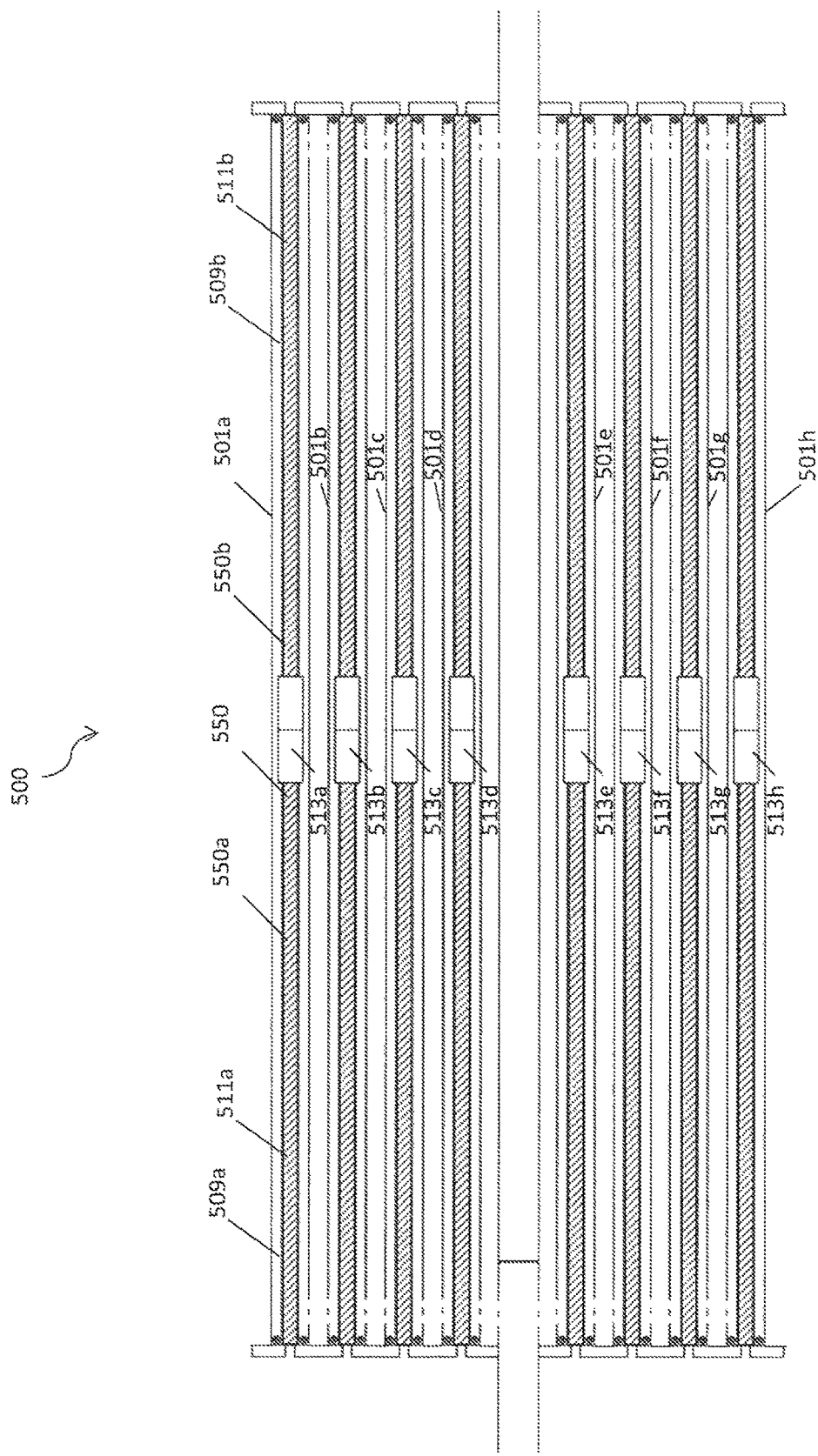
FIG. 5 is a schematic drawing showing an embodiment of the gas separation membrane module comprising two membrane sections within each tube connected together by a gas-tight connector.
Figure 6:
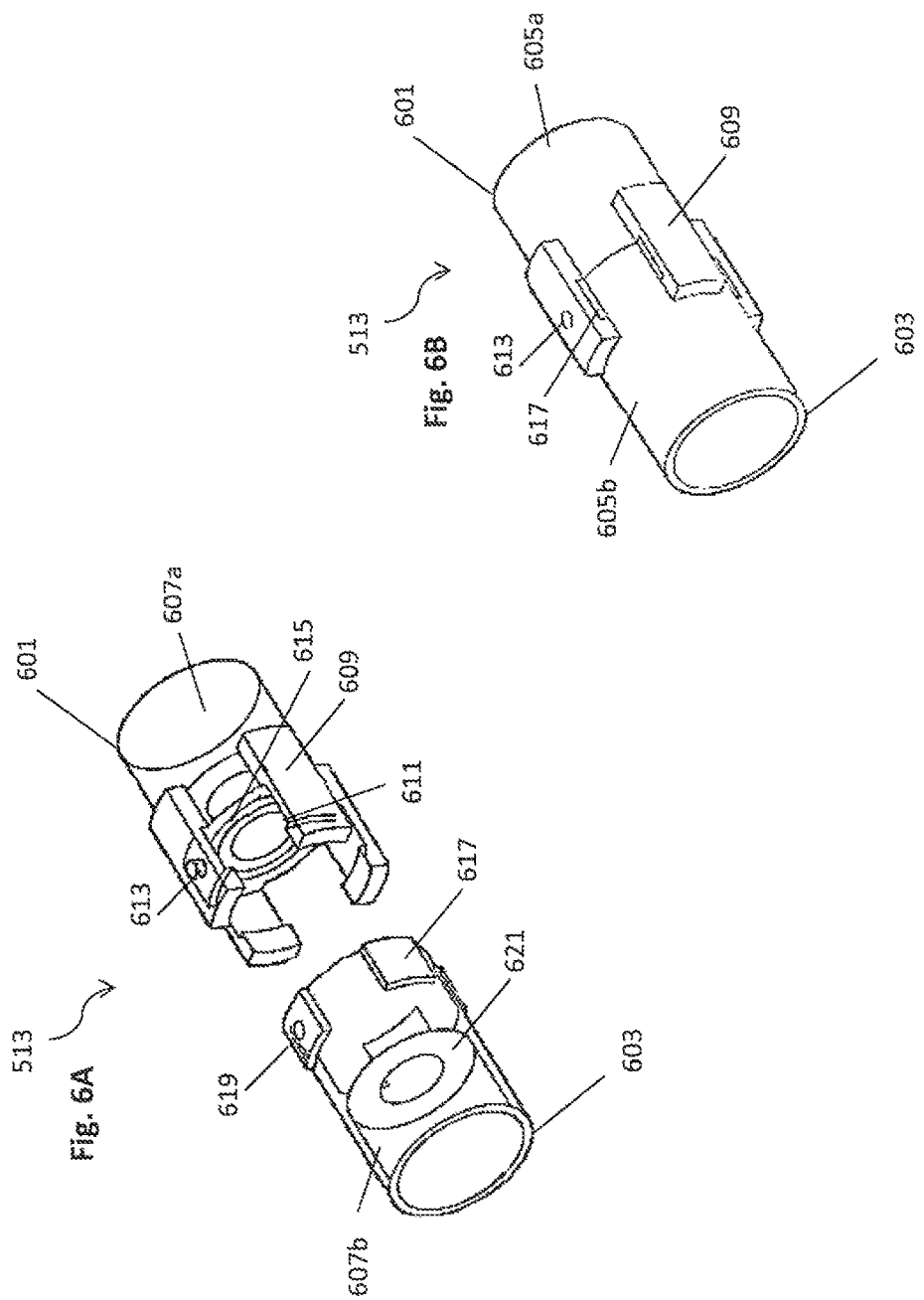
FIG. 6A-B is a schematic drawing showing (FIG. 6A) an internal view of a detached first portion and a detached second portion of the gas-tight connector of FIG. 5 and (FIG. 6B) an external view of attached first and second portions of the gas-tight connector of FIG. 5.

A view of an embodiment of the gas separation membrane module comprising two membrane sections within each tube connected together by a gas-tight connector is shown in FIG. 5.

Module 500 contains a plurality of tubes, 501a-h, each housing a ceramic tubular membrane, 550. The membrane is made up to two sections, 550a and 550b, each having an outer wall, 509a-b, and an inner lumen 511a-b. Membrane sections 550a and 550b are connected in a gas-transferring relationship by a gas-tight connector, 513. Connectors 513a-h allow feed/residue gas to flow from the inner lumen, 511a, to inner lumen 511b.

FIG. 6A-B shows a detailed schematic drawing of an embodiment of the gas-tight connector, 513. Gas-tight connector 513 comprises a first section, 601, and a second section, 603. Sections 601 and 603 are detachable from one another. FIG. 6A illustrates sections 601 and 603 when separated and FIG. 6B illustrates the sections when fitted together.

First section 601 comprises an outer wall, 605a, and an interior, 607a. At one end of the first section, 601, there are a series of individual ribs, 609, positioned around the end of first section 601 that are slightly raised above the outer wall, 605a. The ribs, 609, extend beyond the connector interior, 607a. Each of the ribs, 609, has a grove, 611. Additionally, one of the ribs contains a locking pin, 613. The first section interior, 607a, contains a grove for a gasket, 615.

Second section 603 also comprises an outer wall, 605b, and an interior, 607b. At one end of the second section, 603, there is a series of raised portions, 617, that correspond to groves, 611 of the ribs, 609, from the first section, 601. One of the raised portions, 617, contains a hole, 619, for locking pin 613. The second section interior, 607*b*, contains a gasket, 621.

As shown in FIG. 6B, first and second sections 601 and 603 are fitted together by aligning and rotating the ribs, 609, to interlock and fit over raised portions, 617. Locking pin 613 is placed in hole 619 to secure the sections together. A gasket, 621, fits in the gasket grove, 615, which creates a gas-tight seal within the connector, 513, and prevents feed/residue gas from leaking out of the inner lumen.

Figure 7:
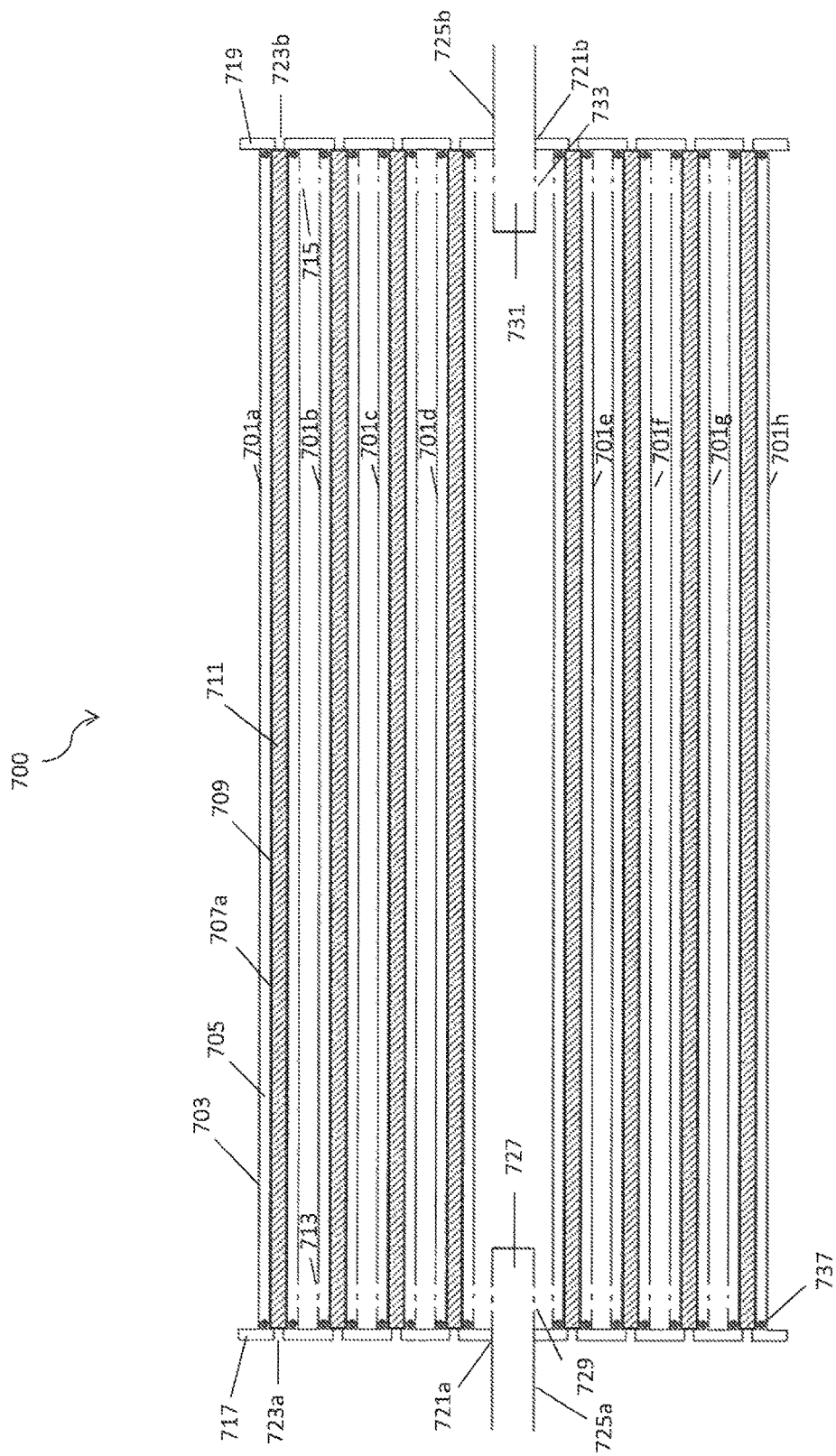
FIG. 7 is a schematic drawing showing an embodiment of the gas separation membrane module having two separate, short gas distribution pipes.

FIG. 7 illustrates an embodiment of the gas separation module in which the gas distribution pipe is split into two separate/discrete, short sections rather than a single gas distribution pipe running the length of the module.

Module 700, contains a plurality of tubes, 701*a-h*, each of which comprise a longitudinal tube wall, 703, and a tube interior, 705, which is enclosed by the tube wall. The tube wall comprises at least one first permeate gas opening, 713, at one end and a second permeate/sweep gas opening, 715, at the other end.

Each tube, 701*a-h*, houses a ceramic tubular membrane, 707*a-h* (only one shown), which comprises an outside surface, 709, and inner surface (not labeled for simplicity), and an inner lumen, 711. The membranes, 707*a-h*, are inserted into the tubes, 701*a-h*, through the open ends. The inside surface of the membranes comprises the membrane selective layer, meaning that the module is adapted to have a permeate flow from the inner lumen, 111, to the outside surface, 709.

The tubes, 701*a-h*, are held within the module, 700, by means of a first tube sheet plate, 717, and a second tube sheet plate, 719. Tube sheet plates, 717 and 719, comprise a gas distribution pipe opening, 721*a-b*, and a plurality of feed/residue gas openings, 723*a-b*, for each tube, 701*a-h*. The tubes are aligned over the feed/residue gas openings to provide gas-transferring communication between the feed/residue gas openings, 723*a-b*, and the inner lumen, 711.

Gas-tight seals, 737 (only one labeled for simplicity), are placed at the end of each ceramic tubular membrane, 707, for holding the membrane in gas-tight relationship against the tube sheet plates, 717 and 719.

A first permeate gas distribution pipe, 725*a*, runs through distribution pipe opening, 721*a*. The first permeate gas distribution pipe, 725*a*, has a first permeate pipe interior, 727, and contains at least one first permeate gas aperture, 729, that is in gas-transferring communication with the permeate gas openings, 713, of each tube, 701*a-h*. At the other end of module 700, a second permeate/sweep gas distribution pipe, 725*b*, runs through distribution pipe opening, 721*b*. The second permeate/sweep gas distribution pipe, 725*b*, has a second permeate/sweep pipe interior, 731, and contains at least one second permeate/sweep gas aperture, 733, that is in gas transferring communication with the second permeate/sweep gas openings, 715, of each tube, 701*a-h*.

In this embodiment, during operation, in order to prevent the sweep gas from bypassing the tubes and mixing with the permeate gas, the module interior is divided into a first permeate chamber (not shown) and a second permeate/sweep chamber (not shown) by a dividing plate (not shown).

A view of a basic embodiment of a gas separation assembly housing the gas separation module, 100 (described above), is shown in FIG. 8. Descriptions of the features of module 100 are described above with reference to FIG. 1. Some of these features are not labeled in FIG. 8 for simplicity. The embodiment in FIG. 8 is arranged in a counter-current flow scheme, however, the assembly, as in the other embodiments, may be reconfigured to allow for other schemes, such as cross-flow or co-flow, to be used.

The assembly, 800, includes a vessel, 801, containing a module, 100. The vessel or housing has an outer wall or shell, 803, and an interior space, 805, located between a first removable head, 807, and a second removable head, 813.

Outer wall or shell, 803, further comprises a feed nozzle, 811, at the end of the vessel, 801, near the first removable head, 807, and a residue nozzle, 817, at the other end of the vessel near the second removable head, 813.

First removable head, 807, comprises a first permeate nozzle, 809. A first permeate gas extension pipe, 823, runs through the first removable head, 807, and is connected to the gas distribution pipe, 125, by connector, 821*a*, to be in gas-transferring communication with first permeate section 131. The second removable head, 813, comprises a second permeate/sweep nozzle, 815. A second permeate/sweep gas extension pipe, 825, runs through the second removable head, 813, and is connected to the gas distribution pipe, 125, by connector, 821*b*, to be in gas-transferring communication with second permeate/sweep section, 135.

The vessel interior, 805, contains module 100. Expandable gas-tight seals, 819*a-b*, are placed around each of the first and second tube sheet plates, 117 and 119, for holding module 100 in a gas-tight relationship against the shell, 803.

The seals create a module interior, 827, between the first and second tube sheet plates, 117 and 119, as well as a feed chamber, 829, between the first removable head, 807, and the first tube sheet plate, 117, and a residue chamber, 831, between the second removable plate, 813, and the second tube sheet plate, 119. Feed and residue chambers, 829 and 831, are in gas-transferring communication with the feed and residue gas openings, 123*a-b*, of tube sheet plates, 117 and 119, respectively, and with the feed and residue nozzles, 811 and 817.

Assembly 800 further comprises a dividing plate, 843, located within the module interior, 827, to divide the module interior into a first permeate chamber, 835, and a second permeate/sweep chamber, 837.

When the assembly is in use, a raw, untreated feed gas first enters the vessel, 801, through feed nozzle 811, and is collected in feed chamber 829. The feed gas, 839, enters the tubes, 101*a-h*, through a feed gas opening 123*a* in the first tube sheet plate, 117, and into the inner lumen, 111, of the membrane, 107, in the tube, 101*a*. The feed gas comes into contact with the selective layer on the inner surface of the inner lumen, 111. A permeating component within the gas will exit the membrane and flow into the tube interior/permeate flow channel, 105, as a permeate gas, 847*a*. The permeate gas, 847*a*, exits the tubes, 101*a-h*, through permeate gas openings on the tubes, 113. The permeate gas then flows into the permeate section, 131, of gas distribution pipe 125, via permeate aperture, 129. The permeate gas exits the assembly though nozzle 809.

A residue gas, 841, flows through the inner lumen and exits the tubes, 101*a-h* (and module 100), through residue gas openings 123*b* on the second tube sheet plate, 819. The residue gas is collected in residue gas chamber 831 and exits the assembly through residue nozzle 817.

A sweep gas, 847*b*, enters the assembly through nozzle 815 and flows into the module 100 through the sweep gas section, 135, of gas distribution pipe 125. The sweep gas then flows out of the gas distribution pipe, 125, through apertures, 133, and into tubes 101*a-h* via the sweep gas openings, 115, and down a permeate/sweep flow channel (not labeled). A gas-tight plate, 845, within the gas distribution pipe 125, prevents the sweep gas, 847b, from mixing with the permeate gas, 847a.

Figure 9:
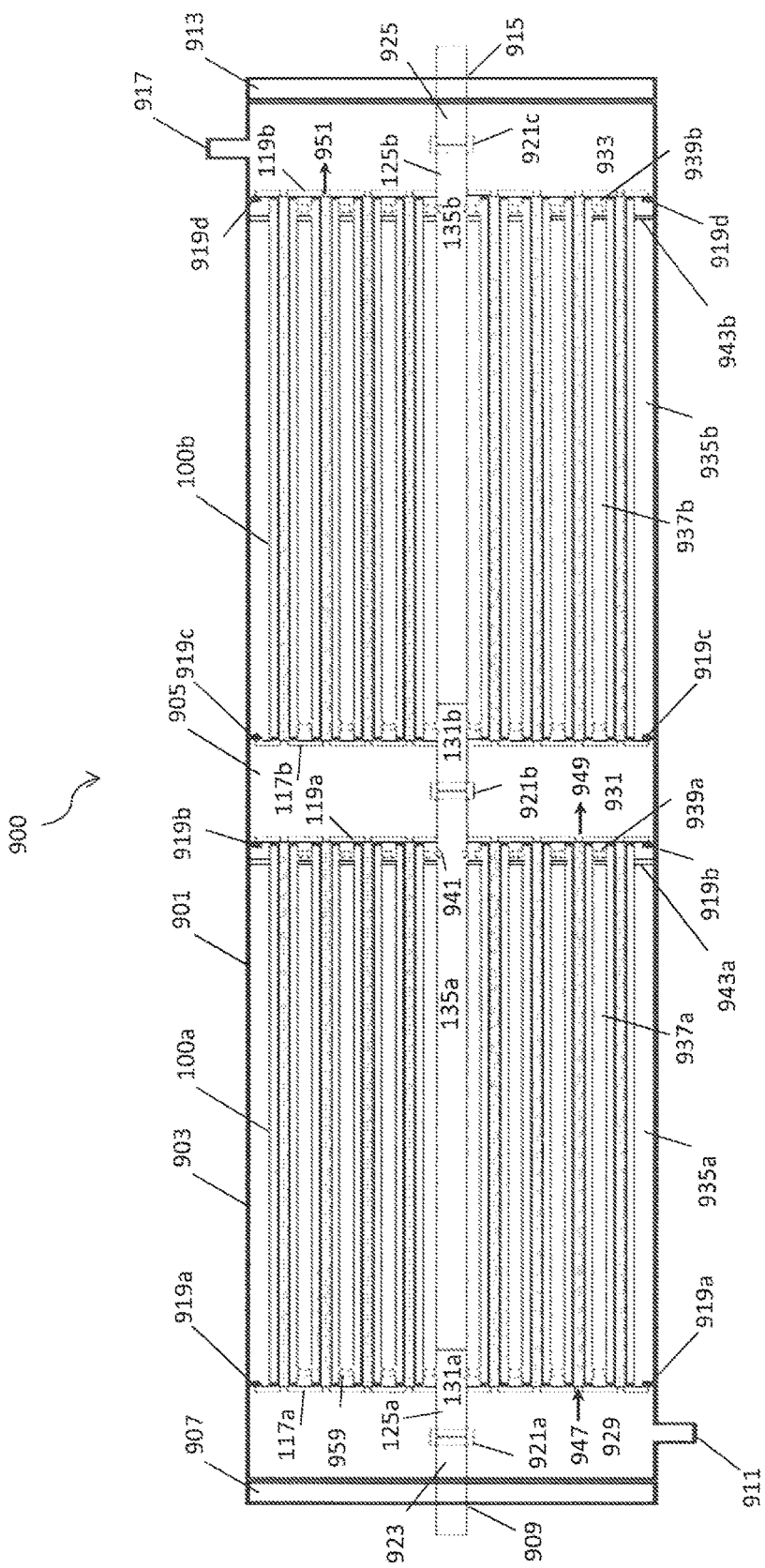
FIG. 9 is a schematic drawing showing an embodiment of an assembly adapted to house more than one module of FIG. 1.

A view of a basic embodiment of a gas separation assembly housing two gas separation membrane modules, 100a and 100b, is shown in FIG. 9. Descriptions of the features of modules 100a and 100b are described above with reference to FIG. 1. Some of these features of the modules are not labeled in FIG. 9 for simplicity.

The assembly, 900, includes a vessel, 901, containing modules, 100a and 100b. The vessel or housing has an outer wall or shell, 903, and an interior space, 905, located between a first removable head, 907, and a second removable head, 913.

Outer wall or shell, 903, further comprises a feed nozzle, 911, at the end of the vessel, 901, near the first removable end plate, 907, and a residue nozzle, 917, at the other end of the vessel near the second removable end plate, 913.

First removable end plate, 907, comprises a first permeate nozzle, 909. A first permeate gas extension pipe, 923, runs through first removable end plate 907 and is connected to a gas distribution pipe, 125a, by connector, 921a, to be in gas-transferring communication with first permeate section 131a of the first module, 100a. The second removable end plate, 913, comprises a second permeate/sweep gas extension pipe opening, 915. A second permeate/sweep gas extension pipe, 925, runs through second removable end plate 913 and is connected to the gas distribution pipe, 125b, by connector, 921c, to be in gas-transferring communication with second permeate/sweep section, 135b, of the second module, 100b.

The vessel interior, 905, contains modules 100a and 100b. Expandable gas-tight seals, 919a-d, are placed around each of the first and second tube sheet plates, 117a-b and 119a-b, of each module for holding the modules in a gas-tight relationship against the shell, 903. The seals create a module interior, 935a-b, between the first and second tube sheet plates, 117a-b and 119a-b of each module. The seals also create a first chamber, 929, between the first removable head, 907, and the first tube sheet plate, 117a; a second chamber, 931, between second tube sheet plate 119a of module 100a and first tube sheet plate 117b of module 101b; and a third chamber, 933, between second tube sheet plate 119b of module 100b and second removable head 913.

For purposes of the embodiment of FIG. 9, the first chamber, 929, is the feed chamber, the second chamber, 931, is a first residue chamber, and the third chamber, 933, is a second residue chamber. The feed and first residue chambers, 929 and 933, are in gas-transferring communication with the feed/residue gas openings (not labeled) of tube sheet plates, 117a and 119b, respectively, and with the feed and residue gas nozzles, 911 and 917. The second residue chamber, 931, is in gas-transferring communication with the residue/feed gas openings (not labeled) of tuber sheet plates, 119a and 117b, respectively.

The second permeate/sweep gas section, 135a, of the gas distribution pipe from the first module 100a is connected to the first permeate section, 131b, of the gas distribution pipe from module 100b by connector 921b. This provides gas-transferring communication of the permeate gas (or sweep gas) between the modules.

Assembly 900 further comprises dividing plates, 943a-b, located within the module interiors, 935a-b, to divide the module interiors into first permeate chambers, 937a-b, and second permeate/sweep gas chambers, 939a-b.

When the assembly is in use, a raw, untreated feed gas first enters the vessel, 900, through feed nozzle 911, and is collected in feed chamber 929. The feed gas, 947, enters the tubes, 101a-h, of module 100a through a feed gas opening (not labeled) in the first tube sheet plate, 117a. Within module 100a, the feed gas, typically at high pressure, passes through the inner lumen of the membrane in tube 101a. The permeate side of the membrane is normally maintained at lower pressure to provide a driving force for transmembrane permeation.

The feed gas comes into contact with the selective layer on the inner surface of the inner lumen, 111. A permeating component within the gas will exit the membrane and flow into the tube interior/permeate flow channel (not labeled) as a permeate gas (not labeled). The permeate gas exits the tubes, 101a-h, through permeate gas openings (not labeled) on the tubes. The permeate gas then flows into the permeate section, 131a, of gas distribution pipe 125, via the permeate aperture (not labeled). The permeate gas exits the assembly though nozzle 909.

A residue gas, 949, flows through the inner lumen and exits the tubes, 101a-h (and module 100a), through residue gas openings (not labeled) on the second tube sheet plate, 919a. The residue gas is collected in second residue chamber 931 and is then passed as a feed gas into module 100b through its feed gas openings on first tube sheet plate 117b.

The feed gas entering module 100b undergoes the same treatment as described above for the feed gas in module 100a. A residue gas, 951, exits module 100b and is collected in a first residue chamber, 933. The residue gas, 951, exits the assembly though residue nozzle 917.

To provide an additional driving force for transmembrane permeation, a sweep gas enters the assembly through nozzle 915 and flows into the module 100b through the sweep gas section, 135b, of gas distribution pipe 125b. The sweep gas then flows out of the gas distribution pipe, 125b, through the sweep gas apertures (not labeled), into tubes 101a-h via the sweep gas openings (not labeled), and down a permeate/sweep flow channel (not labeled). A gas-tight plate within the gas distribution pipe 125b, prevents the sweep gas from mixing with the permeate gas.

The permeate gas withdrawn from module 100b is passed as a sweep gas to module 100a. The sweep gas that enters module 100a takes the same route as the sweep gas described above for module 100b.

Applicants have described and illustrated various specific embodiments of the subject invention, from which those of skill in the art will be able to devise other variants without departing from the scope of the invention.

We claim:

1. A gas separation module, comprising:
   (a) a plurality of tubes each having a longitudinal tube wall comprising at least one first permeate gas opening and a tube interior containing a ceramic tubular membrane that has an outside surface, an inner surface, and an inner lumen, wherein the space between the outside surface of the membrane and the tube wall form a permeate flow channel within the tube interior that is in gas-transferring communication with the permeate gas openings;
   (b) a first tube sheet plate and a second tube sheet plate each positioned at opposite ends of the module, the first tube sheet plate containing a gas distribution pipe opening and a plurality of feed gas openings, one feed gas opening for each tube, and the second tube sheet plate having a plurality of residue gas openings, one residue gas opening for each tube, the tubes being aligned with the feed and residue gas openings to provide gas-transferring communication between the feed and residue gas openings and the inner lumens;

(c) a gas distribution pipe that runs through the gas distribution pipe opening, having a pipe interior comprising at least one first permeate aperture to provide gas-transferring communication with the permeate gas openings; and (d) a gas-tight seal at each end of each ceramic tubular membrane for holding the membrane in gas-tight relationship against the first and second tube sheet plates to prevent a feed or residue gas from entering the permeate flow channel.

2. The gas separation module of claim 1, wherein the feed and residue gas openings have a diameter that is smaller than the outer diameter of the ceramic tubular membrane.

3. The gas separation module of claim 1, wherein the second tube sheet plate also contains a gas distribution opening for the gas distribution pipe to run through.

4. The gas separation module of claim 3, wherein the gas distribution pipe runs the length of the module.

5. The gas separation module of claim 3, wherein the gas distribution pipe comprises two discrete sections, a first section running through the gas distribution pipe opening of the first tube sheet and a second section running through the gas distribution pipe opening of the second tube sheet.

6. The gas separation module of claim 3, wherein the module is adapted to either withdraw a second permeate gas out of the module or introduce a sweep gas stream into the module, wherein:
(I) each tube wall further comprises at least one second permeate/sweep gas opening;
(II) the pipe interior is divided into a first permeate section and a second permeate/sweep section;
(III) the at least one first permeate aperture is located in the first permeate section of the pipe interior of the gas distribution pipe;
(IV) the gas distribution pipe further comprises at least one second permeate/sweep aperture in the second permeate/sweep section to provide gas-transferring communication with the second permeate/sweep gas openings; and
(V) the module further comprises a dividing plate located between the at least one first permeate aperture and the at least one second permeate/sweep aperture, the dividing plate having a gas distribution pipe opening and a plurality of tube openings, one tube opening for each tube.

7. The gas separation module of claim 6, wherein the pipe interior is divided into a first permeate section and a second permeate/sweep section by at least one gas-tight plate positioned between the at least one permeate aperture and the at least one second permeate/sweep aperture.

8. The gas separation module of claim 1, wherein each tubular ceramic membrane comprises two or more membrane sections coupled together by a gas-tight connector.

9. A gas separation assembly, comprising:
(a) a vessel having a first head comprising a permeate nozzle, a second head, and a shell between the heads, the heads and the shell defining a vessel interior;
(b) a module as in claim 1 mounted in the vessel interior, and aligned with the gas distribution pipe protruding towards or through the first permeate nozzle;
(c) a gas-tight seal around each of the first and second tube sheet plates for holding the module in a gas-tight relationship against the shell, thereby creating a module interior between the first and second tube sheet plates, a feed chamber between the first head and the first tube sheet plate, and a residue chamber between the second head and the second tube sheet plate;
(d) a feed nozzle located on the vessel in gas-transferring communication with the feed chamber; and
(e) a residue nozzle located on the vessel in gas-transferring communication with the residue chamber.

10. The assembly of claim 9, wherein at least one of the first or second heads is removable.

11. The assembly of claim 9, wherein the feed nozzle is either located on the shell of the vessel or the first head and the residue nozzle is either located on the shell of the vessel or the second head.

12. The assembly of claim 9, further comprising a permeate extension pipe running through the first permeate nozzle of the first head, the extension pipe being in gas-transferring communication with the gas distribution pipe.

13. A gas separation assembly, comprising:
(a) a vessel having a first head comprising a permeate nozzle, a second head, and a shell between the heads, the heads and the shell defining a vessel interior;
(b) a module as in claim 6 mounted in the vessel interior, and aligned with the gas distribution pipe protruding towards or through the first permeate nozzle;
(c) a gas-tight seal around each of the first and second tube sheet plates for holding the module in a gas-tight relationship against the shell, thereby creating a module interior between the first and second tube sheet plates, a feed chamber between the first head and the first tube sheet plate, and a residue chamber between the second head and the second tube sheet plate;
(d) a feed nozzle located on the vessel in gas-transferring communication with the feed chamber; and
(e) a residue nozzle located on the vessel in gas-transferring communication with the residue chamber;
wherein:
(I) the second head comprises a second permeate/sweep nozzle, the module being aligned with the gas distribution pipe that protrudes towards or through the second permeate/sweep nozzle; and
(II) the dividing plate is located within the module interior and is in a gas-tight relationship against the shell, thereby creating a permeate chamber and a sweep chamber.

14. A gas separation assembly, comprising:
(a) a vessel having a first head comprising a first permeate nozzle, a second head, and a shell between the heads, the heads and the shell defining a vessel interior;
(b) at least two modules as in claim 1 mounted in the vessel interior;
(c) a gas-tight seal around each of the first and second tube sheet plates of each module for holding the modules in a gas-tight relationship against the shell, thereby creating a module interior between the first and second tube sheet plates, a first chamber between the first head and the first tube sheet plate of the first module, a second chamber between the second tube sheet plate of the first module and the first tube sheet plate of the second module, and a third chamber between the second head and the second tube sheet plate of the second module;
(d) a feed nozzle located on the vessel in gas-transferring communication with one of the chambers; and
(e) a first residue nozzle located on the vessel in gas-transferring communication with one of the chambers.

15. The assembly of claim 14, wherein:
(I) the first chamber is a feed chamber, the second chamber is a first residue chamber, and the third chamber is a second residue chamber; and
(II) the first residue nozzle is in gas-transferring communication with the third chamber;
(III) the at least two modules being connected by the gas distribution pipe running through each module, and the gas distribution pipe protruding towards or through the first permeate nozzle.

16. The assembly of claim 14, wherein:
(I) the second head comprises a second permeate/sweep gas nozzle;
(II) the first chamber is a feed chamber, the second chamber is a first residue chamber, and the third chamber is a second residue chamber;
(III) the first residue nozzle is in gas-transferring communication with the third chamber; and
(IV) the at least two modules being connected by the gas distribution pipe running through each modules, and the gas distribution pipes protruding towards or through both the first permeate nozzle and the second permeate/sweep gas nozzle.

17. The assembly of claim 14, wherein:
(I) the second head comprises a second permeate/sweep gas nozzle;
(II) the first chamber is a first residue chamber, the second chamber is a feed chamber, and the third chamber is a second residue chamber;
(III) the first residue nozzle is in gas-transferring communication with the first chamber;
(IV) a second residue nozzle located on the vessel is in gas-transferring communication with the third chamber; and
(V) the gas distribution pipe of one of the at least two modules protruding towards or through the first permeate nozzle and the gas distribution pipe of another one of the at least two modules protruding towards or through the second permeate/sweep gas nozzle.

18. The assembly of claim 14, wherein the feed nozzle is either located on the shell of the vessel or the first head and the residue nozzle is either located on the shell of the vessel or the second head.

19. The assembly of claim 14, further comprising a first permeate extension pipe running through the first permeate nozzle of the first head and a second permeate/sweep gas extension pipe running through the second permeate/sweep gas nozzle of the second head, each extension pipe being in gas-transferring communication with the gas distribution pipe.

20. The assembly of claim 14, wherein at least one of the first or second heads is removable.

* * * * *